United States Patent  
Frenkel

(10) Patent No.: US 9,584,521 B2
(45) Date of Patent: *Feb. 28, 2017

(54) BI-DIRECTIONAL COMMUNICATION OVER A ONE-WAY LINK

(71) Applicant: Waterfall Security Solutions Ltd., Rosh HaAyin (IL)

(72) Inventor: Lior Frenkel, Moshav Misgav Dov (IL)

(73) Assignee: WATERFALL SECURITY SOLUTIONS LTD., Rosh HaAyin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,469

(22) Filed: Jul. 20, 2016

(65) Prior Publication Data

US 2016/0330203 A1 Nov. 10, 2016

Related U.S. Application Data

(63) Continuation of application No. 13/867,145, filed on Apr. 22, 2013, now Pat. No. 9,419,975.

(51) Int. Cl.
*H04L 29/06* (2006.01)
*H04Q 11/00* (2006.01)
*H04L 12/701* (2013.01)

(52) U.S. Cl.
CPC .......... *H04L 63/10* (2013.01); *H04L 63/0209* (2013.01); *H04Q 11/0062* (2013.01); *H04L 45/00* (2013.01); *H04L 63/0428* (2013.01); *H04Q 2213/1302* (2013.01)

(58) Field of Classification Search
CPC ..... H04L 45/00; H04L 63/10; H04L 63/0428; H04Q 2213/1302
See application file for complete search history.

(56) References Cited

U.S. PATENT DOCUMENTS

| | | | | | |
|---|---|---|---|---|---|
| 3,377,541 | A | * | 4/1968 | Farkas | H02M 7/51 363/60 |
| 6,356,546 | B1 | * | 3/2002 | Beshai | H04L 45/302 370/358 |
| 6,640,308 | B1 | * | 10/2003 | Keyghobad | G05B 19/042 370/254 |
| 6,754,185 | B1 | * | 6/2004 | Banerjee | H04L 12/40058 370/282 |
| 6,820,110 | B1 | * | 11/2004 | Engel | H04L 29/06 709/200 |
| 7,469,311 | B1 | * | 12/2008 | Tsu | G06F 13/4018 710/29 |
| 7,992,209 | B1 | * | 8/2011 | Menoher | H04L 63/105 726/16 |
| 2009/0328183 | A1 | * | 12/2009 | Frenkel | G06F 21/567 726/11 |
| 2014/0020109 | A1 | * | 1/2014 | Mraz | H04L 63/0428 726/26 |

* cited by examiner

*Primary Examiner* — Eleni Shiferaw
*Assistant Examiner* — Gregory M Elmore
(74) *Attorney, Agent, or Firm* — D. Kligler IP Services Ltd.

(57) ABSTRACT

Apparatus for communication includes a single one-way link, which is physically capable of carrying the communication signals in one direction and incapable of carrying the communication signals in the opposite direction. Ancillary circuitry is coupled so as to cause the single one-way link to convey both first communication signals from a first station to a second station and second communication signals from the second station to the first station.

17 Claims, 2 Drawing Sheets

BI-DIRECTIONAL COMMUNICATION OVER A ONE-WAY LINK

CROSS-REFERENCE TO RELATED APPLICATION

This application is a continuation of U.S. patent application Ser. No. 13/867,145, filed Apr. 22, 2013.

FIELD OF THE INVENTION

The present invention relates generally to digital communications and control, and particularly to systems and methods for secure communications.

BACKGROUND

In a computer network handling mission critical activities, portions of the network may be connected by one-way links. The term "one-way link" is used in the context of the present patent application and in the claims to refer to a communication link that is physically capable of carrying signals in one direction and is physically incapable of carrying signals in the opposite direction. One-way links may be implemented, for example, using Waterfall® systems, which are manufactured by Waterfall Security Solutions, Ltd. (Rosh HaAyin, Israel). The Waterfall system provides a physical one-way connection based on fiberoptic communication, using an underlying proprietary transfer protocol. When a transmitting computer is connected by a Waterfall system (or other one-way link) to a receiving computer, the receiving computer can receive data from the transmitting computer but has no physical means of sending any return communications to the transmitting computer.

One-way links may be used to prevent data either from entering or leaving a protected facility. For example, confidential data that must not be accessed from external sites may be stored on a computer that is configured to receive data over a one-way link and has no physical outgoing link over which data might be transmitted to an external site. On the other hand, in some applications, the operator of the protected facility may be prepared to allow data to exit the facility freely via a one-way link, while preventing data or other communications from entering the facility in order to thwart malware propagation, hackers and cyber-terrorists.

In this latter category, for example, U.S. Pat. No. 7,649,452, whose disclosure is incorporated herein by reference, describes protection of control networks using a one-way link. This patent describes a method for monitoring a process that includes receiving a signal from a sensor that is indicative of a physical attribute associated with the process and transmitting data indicative of the received signal over a one-way link. The transmitted data received from the one way link are used in monitoring the process. The method is described in the patent particularly in the context of Supervisory Control And Data Acquisition (SCADA) systems. A SCADA system receives monitoring data from the monitored facility via a one-way link. The SCADA system is unable to transmit any sort of data back to the monitored facility (although a separate, open-loop connection may be provided for this purpose), and therefore cannot be used as the base for an attack on the facility.

SUMMARY

Embodiments of the present invention that are described hereinbelow provide apparatus and methods that can be used to provide a safe input channel to a protected destination.

There is therefore provided, in accordance with an embodiment of the present invention, communication apparatus, which includes first and second inputs, coupled respectively to receive communication signals from first and second stations, and first and second outputs, coupled respectively to convey the received communication signals to the first and second stations. A single one-way link, which is physically capable of carrying the communication signals in one direction and incapable of carrying signals in the other, opposite direction, is coupled to at least one switch, which is configured to be toggled between at least a first configuration, in which the communication signals are conveyed from the first input via the single one-way link to the second output, and a second configuration, in which the communication signals are conveyed from the second input via the single one-way link to the first output.

In a disclosed embodiment, the at least one switch includes at least a first double-pole switch, which is coupled between the first and second inputs and a transmit side of the single one-way link and is configured to select the first input for connection to the transmit side of the single one-way link in the first configuration and to select the second input for connection to the transmit side of the single one-way link in the second configuration. The at least one switch may further include a second double-pole switch, which is coupled between the first and second outputs and a receive side of the single one-way link and is configured to select the second output for connection to the receive side of the single one-way link in the first configuration and to select the first output for connection to the receive side of the single one-way link in the second configuration. The at least one switch may include an electrical relay or an optical switch.

In a typical embodiment, the first station is located in a protected network, and the apparatus includes control logic, which is configured to hold the at least one switch normally in the first configuration to enable transmission of data from the first station to the second station, and to toggle the at least one switch to the second configuration only at selected times to enable input of instructions from the second station to the first station. The protected network may be a part of an industrial control system in a protected facility.

In some embodiments, the apparatus includes control logic, which is configured to hold the at least one switch normally in the first configuration and to toggle the at least one switch to the second configuration at fixed, predefined times. Additionally or alternatively, the control logic may be configured to toggle the at least one switch to the second configuration only in response to an authorized command. The control logic may be configured to toggle the at least one switch to the second configuration for a sufficient time to convey, via the apparatus, no more than a present number of messages to the first station, before reverting to the first configuration. Further additionally or alternatively, the control logic may be configured to wait for a certain delay period before toggling the at least one switch to the second configuration.

In one embodiment, the at least one switch has a third configuration, in which no communication signals are conveyed either from the first input to the second output or from the second input to the first output.

There is also provided, in accordance with an embodiment of the present invention, a method for communication, which includes transmitting both first communication signals, from a first station to a second station, and second communication signals, from the second station to the first station, via a single one-way link, which is physically capable of carrying the communication signals in one direction and incapable of carrying the communication signals in the opposite direction.

In disclosed embodiments, transmitting both the first and the second communication signals includes controlling the one-way link so that at any given time during which the first and second stations are in communication, the one-way link carries either the first communication signals or the second communication signals, but not both the first and second communication signals.

There is additionally provided, in accordance with an embodiment of the present invention, apparatus for communication, which includes a single one-way link, which is physically capable of carrying the communication signals in one direction and incapable of carrying the communication signals in the opposite direction. Ancillary circuitry is coupled so as to cause the single one-way link to convey both first communication signals from a first station to a second station and second communication signals from the second station to the first station.

The present invention will be more fully understood from the following detailed description of the embodiments thereof, taken together with the drawings in which:

DETAILED DESCRIPTION OF EMBODIMENTS

Figure 1:
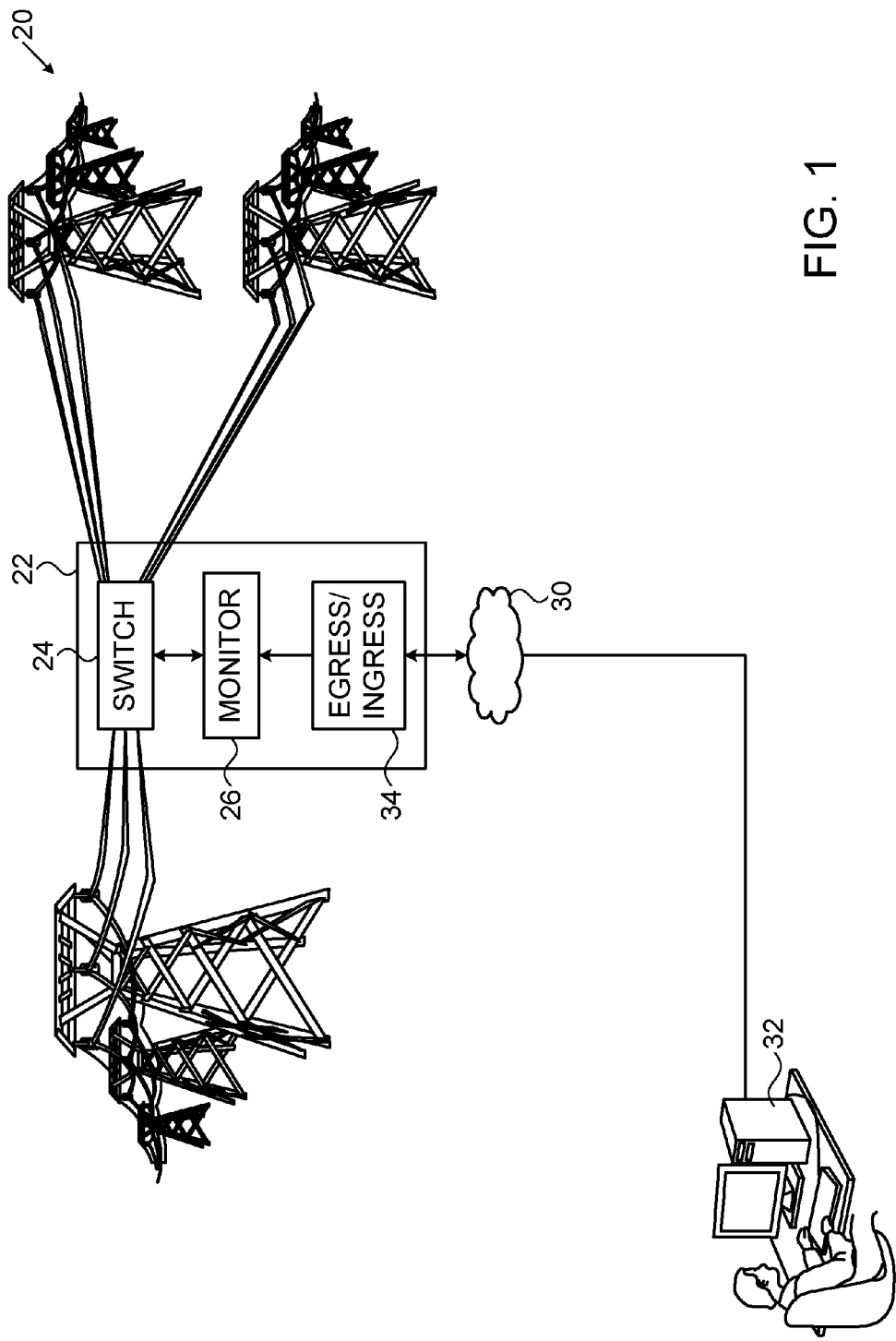
FIG. 1 is a block diagram that schematically illustrates a system for secure monitoring and control, in accordance with an embodiment of the present invention.

Unlike conventional firewalls, one-way links permit information to leave a protected facility without risk to the safety or availability of the network in the facility due to attacks originating from an external network, since the one-way link offers no physical channel through which such an attack could be carried out. In practice, however, there is sometimes a need to transmit at least small amounts of information from an external network back into the protected facility, particularly, for example, when a facility is in a remote location and is unattended. In some installations, a separate communications channel (which may comprise a one-way link from the external network into the protected facility) is provided for this purpose.

There are a number of risks associated with this latter sort of communications. For example, an attacker might use the communications channel into the facility to cause unsafe or unreliable conditions in the protected network, by means of a buffer overflow attack, for instance. Such an attack could then be used to introduce remote control malware into the protected network, and provide an attacker with the means to interactively explore and sabotage the protected network.

Mounting an attack of this sort generally requires that the attacker maintain an interactive two-way connection with a computer in the facility for at least a minimal amount of time, in order to be able to assess the response of the computer to messages sent from outside the facility. A sophisticated attacker may use one-way links into and out of the facility simultaneously to provide desired virtual two-way communication channel, as a platform for commencing an attack. Once the virtual bi-directional communication channel has been set up, a cyber attack using standard tools and techniques. The present inventor has realized, however, that if a single one-way link is set up so that at any given time, the one-way link carries either outgoing communication signals from the facility or ingoing communication signals to the facility, but not both (as it is physically impossible), the attacker's attempts to establish simultaneous bidirectional communication to the facility will be stymied.

Embodiments of the present invention that are described hereinbelow build on this realization to provide methods and apparatus for communications in which signals are conveyed both from a first station to a second station and from the second station to the first station via the same, single one-way link at different times. One or more switches are typically coupled to the one-way link and toggle the link between two distinct configurations: one in which communication signals flow via the one-way link only from the first station to the second, and the other in which the signals flow only from the second station to the first. The "first station" may be, for example, a computer in a protected facility, which transmits data for monitoring purposes, which the "second station" is a monitoring and control terminal outside the facility; but the principles of the present invention may similarly be applied in protecting computers and networks of other sorts.

The use of a single one-way link in this manner to support bi-directional communications is advantageous in reducing hardware costs and space requirements, relative to conventional systems that use separate one-way links for ingress to and egress from a protected facility. Furthermore, the configuration of the single one-way link in the disclosed embodiments enforces, in hardware, a half-duplex communication model, making it impossible for an attacker to conduct a simultaneous two-way communication session with a computer in a protected facility. The possibility of attack may be further inhibited by holding the one-way link normally in the configuration in which data are output from the protected facility, and strictly limiting the times at which the link is toggled to permit transmission into the protected facility. The duration of each such transmission may be limited, as well.

FIG. 1 is a block diagram that schematically illustrates a system 20 for secure monitoring and control, in accordance with an embodiment of the present invention. In this example, system 20 is used to monitor and control an industrial control system in a utility control station 22, such as a transmission and switching substation of an electric power utility. Although for the sake of simplicity, only a single station 22 is shown in FIG. 1, in practice utilities generally operate many such stations. Station 22 typically comprises operational elements, such as switches 24, which make and break power connections. In many actual systems, stations 22 are unmanned, and switches 24 are controlled remotely by monitoring and control stations, such as a control terminal 32, for example.

Although the pictured example relates, by way of illustration, to an electric power utility, the principles of the present invention are not limited to this particular operating context. Rather, the apparatus and methods that are described below may be applied to utilities of other types (such as gas or water utilities, for instance), as well as in industrial environments and substantially any other application in which tight control is to be exercised over inputs to a protected facility. Station 22 is just one example of such a facility, which is presented here for the sake of clarity of explanation. Certain embodiments of the present invention are described hereinbelow, for the sake of clarity and without limitation, with respect to the elements of system 20, but the principles of these embodiments and the techniques that they incorporate may similarly be applied in other operating environments and system configurations in which a destination is to be protected from undesired data input and unauthorized access.

Station 22 is typically designed as a closed, secure facility, protected physically against unauthorized entry. A monitor 26 in station 22 inputs commands to switches 24 and monitors the operation of the switches and other components of the station. Typically, monitor 26 comprises multiple sensors and actuators, which are distributed throughout station 22 and report via a secure internal network to a controller (not shown), as described, for example, in the above-mentioned U.S. Pat. No. 7,649,452. Monitor 26 outputs data collected from the sensors and actuators via an egress/ingress controller 34 to a network 30, which conveys the data to terminal 32. Network 30 may comprise any suitable wired or wireless network, or a combination of such networks, including public networks, such as the Internet.

Figure 2:
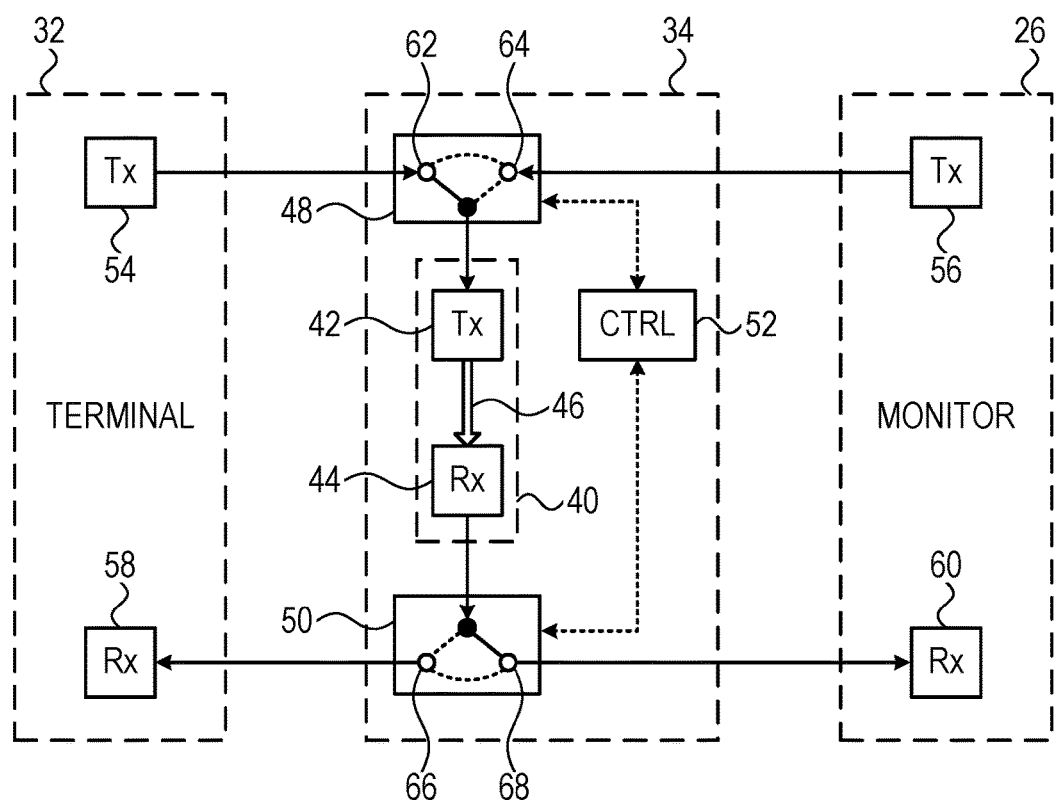
FIG. 2 is a block diagram that schematically shows details of a bi-directional communication controller based on a single one-way link, in accordance with an embodiment of the present invention.

Egress/ingress controller 34 conveys output data from station 22 to network 30 and receives instructions from network 30 for input to station 22. In this example, controller 34 inputs commands to monitor 26, which then actuates switches 24 to carry out the commands. As shown in FIG. 2, controller 34 comprises a one-way link and associated hardware logic, which permits the one-way link to convey commands (and/or other data) into station 22 only at certain well-defined times, which may be preset or may follow a trigger, or be controlled by any other suitable scheduling or triggering mechanism. During these times, controller 34 is physically incapable of data output from station 22 to network 30. Monitor 26 communicates with network 30 only via controller 34 (which may itself be contained in station 22 for protection from physical and electrical tampering.)

FIG. 2 is a block diagram that schematically shows details of egress/ingress controller 34, in accordance with an embodiment of the present invention. Controller 34 comprises a single one-way link 40, which is physically able to carry signals only in one direction: from a link transmitter 42 to a link receiver 44 via a communication medium 46. Link 40 may be, for example, a Waterfall link of the type described above in the Background section, in which medium 46 is an optical fiber, with an optical transmitter at one end and an optical receiver at the other, but any other sort of link with suitable one-way transmission hardware may alternatively be used. Ancillary circuitry, which includes switches and control logic in the present embodiment, is coupled to the one-way link so as to provide the bi-directional communication functionality that is described herein.

One or more switches are coupled to one-way link 40 in order to control whether signals are conveyed through the link from a transmitter 56 in monitor 26 to a receiver 58 in terminal 32 (as is normally the case), or alternatively, at other times, from a transmitter 54 in terminal 32 to a receiver 60 in monitor 26. (Although transmitter 54 and receiver 58 are shown, for clarity of explanation, as separate functional blocks, in practice they are typically implemented as parts of the same communication interface of terminal 32; and similarly, transmitter 56 and receiver 60 may be implemented as parts of the same communication interface of monitor 26.) In the pictured embodiment, these switches take the form of two double-pole switches 48 and 50, but other switch configurations with equivalent functionality, using only a single switch (such as a double-pole double-throw switch) or multiple switches, will be apparent to those skilled in the art and are considered to be within the scope of the present invention. Switches 48 and 50 may comprise electrical relays or optical switches, for example, or any other suitable type of switches that are known in the art.

Switch 48 is coupled between transmitters 54 and 56 to the transmit side (transmitter 42) of one-way link 40, while switch 50 is coupled between the receive side (receiver 44) of the one-way link and receivers 58 and 60. Poles 62 and 64 of switch 48 serve as inputs to egress/ingress controller 34, while poles 66 and 68 serve as the outputs. Control logic 52 controls the operation of switches 48 and 50. Although the control logic is shown in the figures as a unified functional block, it may take a variety of different physical forms. For example, control logic 52 may comprise a programmable processor and/or hardware logic circuits. Alternatively or additionally, the control logic may simply comprise one or more timers connected to switches 48 and 50, possibly in the form of a separate timer for each switch. Further alternatively or additionally, control logic 52 may comprise an external trigger to operate the switches in case of emergency, and/or a physical pushbutton or other control for actuation by a human operator.

Typically, control logic 52 toggles switches 48 and 50 in concert so that in the normal configuration, in which data are transmitted from station 22 to network 30, switch 48 selects pole 64 for connection to the transmit side of one-way link 40, while switch 50 selects pole 66 for connection to the receive side. On the other hand, during the (typically limited) periods during which station 22 is to receive input from network 30, control logic changes the configuration of both switches 48 and 50, so that pole 62 is connected to the transmit side of the one-way link, while pole 68 is connected to the receive side. In this manner, controller 34 emulates the operation of a bi-directional half-duplex link, using the single one-way link 40, however, to carry communications traffic in both directions.

Egress/ingress controller 34 may also support other configurations of switches 48 and 50. For example, in a loop-back configuration, the switches may respectively select poles 64 and 68 at the same time, or poles 62 and 66 at the same time, in which case there is no data connection at all between terminal 32 and station 22. Optionally, one or both of the switches may have an additional position, in which both poles are disconnected. This sort of loopback or disconnected configuration may be the default configuration of controller 34 at startup. In any case, there is no configuration of the two switches that will allow simultaneous bi-directional communications between the terminal and the station. Therefore, the security of station 22 is maintained even if switches 48 and 50 are not mutually synchronized.

As noted earlier, control logic 52 holds switches 48 and 50 normally in the first configuration described above, which enables transmission of data from monitor 26 in station 22 to terminal 32, and toggles the switches to the second configuration only at selected times to enable input of instructions from terminal 32 to station 22. Typically, the toggle takes place only in response to an authorized command. Such a command could be invoked manually by actuating a suitable control, typically located within station 22. Alternatively or additionally, switches 48 and 50 may be toggled on automatic command from control logic 52 at fixed, predefined times, for example, once every few hours.

As a further alternative, control logic 52 may toggle switches 48 and 50 on request (issued from either inside or outside station 22), but only after waiting for a certain delay period. The duration of the delay may be fixed or random and may be accompanied by an alert to a system administrator, who may then intervene if necessary before any damage is done by an attacker who manages somehow to submit a toggle request.

Further additionally or alternatively, for enhanced security, control logic 52 controls switches 48 and 50 so that they toggle to the second configuration only for a short period of time. The timing of this period may be set so that it is sufficient to convey only a preset number of messages (possibly only a single message) from terminal 32 to station 22, before reverting to the first configuration. In this case, too, after the switches have toggled back to the first configuration, logic 52 may wait for a certain delay period before accepting another toggle request.

Although the description above focuses on the elements and operation of egress/ingress controller 34, in practical applications, such a controller may be just one part of an overall secure communications solution. Other methods and apparatus for secure communications in the sort of context that is exemplified by system 20 are described, for example, in the above-mentioned U.S. Pat. No. 7,649,452, as well as in U.S. patent application Ser. No. 13/604,677, filed Sep. 6, 2012, which is assigned to the assignee of the present patent application and whose disclosure is incorporated herein by reference. The embodiments of the present invention that are described herein may optionally be enhanced by integration with such other methods and apparatus.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A communication apparatus for secure monitoring and control, comprising:
   first and second inputs;
   first and second outputs;
   a single one-way link, which is physically capable of carrying communication signals in one direction and incapable of carrying signals in the other, opposite direction;
   a first double-pole switch, coupled between the first and second inputs and a transmit side of the single one-way link, configured to allow passage of signals only from the first input to the transmit side of the single one-way link in a first configuration and to allow flow of signals only from the second input to the transmit side of the single one-way link in a second configuration; and
   a second double-pole switch, coupled between the first and second outputs and a receive side of the single one-way link, and is configured to allow passage of signals from the receive side of the single one-way link only to the second output in the first configuration and only to the first output in the second configuration.

2. The apparatus according to claim 1, wherein the first and second double-pole switches comprise electrical relays.

3. The apparatus according to claim 1, wherein the first and second double-pole switches comprise optical switches.

4. The apparatus according to claim 1, wherein The apparatus comprises control logic, which is configured to hold the first and second double-pole switches in the first configuration and to toggle the first and second double-pole switches to the second configuration only at selected times.

5. The apparatus according to claim 1, and comprising control logic, which is configured to hold the first and second double-pole switches normally in the first configuration and to toggle the first and second double-pole switches to the second configuration at fixed, predefined times.

6. The apparatus according to claim 1, and comprising control logic, which is configured to hold the first and second double-pole switches normally in the first configuration and to toggle the first and second double-pole switches to the second configuration only in response to an authorized command.

7. The apparatus according to claim 6, wherein the control logic is configured to toggle the first and second double-pole switches to the second configuration for a sufficient time to convey, via the apparatus, no more than a preset number of messages, before reverting to the first configuration.

8. The apparatus according to claim 6, wherein the control logic is configured to wait for a certain delay period before toggling the first and second double-pole switches to the second configuration.

9. The apparatus according to claim 1, wherein the first and second double-pole switches have a third configuration, in which no communication signals are conveyed either from the first input to the second output or from the second input to the first output.

10. A method of communication for secure monitoring and control, comprising:
    providing a first double-pole switch having first and second poles coupled, respectively, to first and second stations and the first double-pole switch coupled to a transmit side of a single one-way link, such that in a first configuration signals pass from the first station to the transmit side of the single one-way link; and in a second configuration signals pass from the second station to the transmit side of the single one-way link;
    providing a second double-pole switch having first and second poles coupled, respectively, to convey transmissions to the first and second outputs, and the second double-pole switch coupled to a receive side of the single one-way link, such that in the first configuration transmissions from the single one-way link are conveyed to the second station and in the second configuration transmissions from the single one-way link are conveyed to the first station;
    setting the first and second double-pole switches to the first configuration;
    transmitting first communication signals, from the first station to the second station, through the first and second double-pole switches and the single one-way link; while the first and second double-pole switches are in the first configuration;
    setting the first and second double-pole switches to the second configuration; and
    transmitting second communication signals, from the second station to the first station, via the single one-way link, while the first and second double-pole switches are in the second configuration,
    wherein the single one-way link is physically capable of carrying the communication signals in one direction and incapable of carrying the communication signals in the opposite direction.

11. The method according to claim 10, comprising controlling the one-way link so that at any given time during which the first and second stations are in communication, the one-way link carries either the first communication signals or the second communication signals, but not both the first and second communication signals.

12. The method according to claim 10, wherein the first station is located in a protected network, and comprising controlling the first and second double-pole switches so that the one-way link normally carries only the first communication signals to enable transmission of data from the first station to the second station, and toggling the single one-way link to convey the second communication signals only at selected times in order to enable input of instructions from the second station to the first station.

13. The method according to claim 12, wherein the protected network is a part of an industrial control system in a protected facility.

14. The method according to claim 10, comprising controlling the first and second double-pole switches so that the one-way link normally carries only the first communication signals and toggles to convey the second communication signals only at fixed, predefined times.

15. The method according to claim 10, comprising controlling the first and second double-pole switches so that the one-way link normally carries only the first communication signals and toggles to convey the second communication signals only in response to an authorized command.

16. The method according to claim 15, wherein controlling the first and second double-pole switches comprises toggling the one-way link, in response to the authorized command, to convey the second communication signals only for a sufficient time to convey, via the one-way link, no more than a preset number of messages from the second station to the first station, before reverting to the first configuration.

17. The method according to claim 15, wherein controlling the first and second double-pole switches comprises waiting for a certain delay period after the authorized command before toggling the one-way link to convey the second communication signals.

\* \* \* \* \*